United States Patent
Sollars

(10) Patent No.: US 8,550,559 B2
(45) Date of Patent: Oct. 8, 2013

(54) POWER DISC STYLE SEAT RECLINER

(76) Inventor: Everett Sollars, Wyandotte, MI (US)

( * ) Notice: Subject to any disclaimer, the term of this patent is extended or adjusted under 35 U.S.C. 154(b) by 478 days.

(21) Appl. No.: 12/954,217

(22) Filed: Nov. 24, 2010

(65) Prior Publication Data

US 2012/0126602 A1   May 24, 2012

(51) Int. Cl.
*B60N 2/02* (2006.01)

(52) U.S. Cl.
USPC ........... 297/376; 297/362.11; 403/61; 403/91

(58) Field of Classification Search
USPC .................. 297/356, 354.1, 354.13, 362.11, 297/378.12, 378.14, 354.12, 376; 16/324; 403/59, 61, 91, 103, 113
See application file for complete search history.

(56) References Cited

U.S. PATENT DOCUMENTS

| | | | | |
|---|---|---|---|---|
| 152,476 A * | 6/1874 | Frizell | ........................... | 403/113 |
| 437,598 A * | 9/1890 | Higgins | ........................ | 403/113 |
| 555,201 A * | 2/1896 | Ascheck | ........................ | 403/61 |
| 1,337,817 A * | 4/1920 | Bode | ................................ | 403/113 |
| 2,359,490 A * | 10/1944 | Rappl | ............................. | 49/140 |
| 2,554,292 A * | 5/1951 | Brown | ......................... | 74/551.5 |
| RE23,744 E * | 11/1953 | Magida | ........................ | 482/118 |
| 2,861,501 A * | 11/1958 | Strelakos | ...................... | 359/802 |
| 3,309,121 A * | 3/1967 | Fentiman | ..................... | 403/176 |
| 3,352,580 A * | 11/1967 | Kurz et al. | ...................... | 403/93 |
| 3,397,903 A * | 8/1968 | Archdale et al. | .............. | 403/113 |
| 3,740,791 A * | 6/1973 | Bulin | ............................... | 16/346 |
| 4,882,807 A * | 11/1989 | Frye et al. | ....................... | 16/225 |
| 4,953,259 A * | 9/1990 | Frye et al. | ....................... | 16/225 |
| 5,029,669 A * | 7/1991 | Lew et al. | ....................... | 182/42 |
| 5,116,102 A * | 5/1992 | Chaundy | ....................... | 297/357 |
| 5,234,255 A * | 8/1993 | Kawakita | ................. | 297/354.12 |
| 5,584,311 A * | 12/1996 | Schaefer | ........................ | 135/128 |
| 5,909,923 A * | 6/1999 | DeKraker | ..................... | 297/285 |
| 5,956,810 A * | 9/1999 | Spaeth | ............................. | 16/358 |
| 6,062,584 A * | 5/2000 | Sabol | ............................ | 280/607 |
| 6,186,595 B1 * | 2/2001 | Ward et al. | ................. | 297/378.1 |
| 6,203,051 B1 * | 3/2001 | Sabol | ............................ | 280/607 |
| 6,428,104 B1 * | 8/2002 | Sakamoto et al. | ........ | 297/362.11 |
| 8,104,141 B2 * | 1/2012 | Yamashita | ....................... | 16/239 |
| 8,167,250 B2 * | 5/2012 | White | ............................. | 248/49 |
| 2002/0041120 A1 * | 4/2002 | Glaspie et al. | ................. | 297/374 |
| 2004/0113480 A1 * | 6/2004 | Reed et al. | .................... | 297/408 |
| 2010/0244408 A1 * | 9/2010 | Dean et al. | ................... | 280/647 |
| 2012/0193946 A1 * | 8/2012 | Robertson | ....................... | 297/68 |

FOREIGN PATENT DOCUMENTS

WO    WO 8802716 A1 *   4/1988

\* cited by examiner

*Primary Examiner* — David R. Dunn
*Assistant Examiner* — David E Allred

(57) ABSTRACT

A power disc style seat reclining mechanism for a vehicle seat includes a seat base fixed mounted guide disc pivotally connected to a set of pivotal discs. The pivotal discs include an internal disc segment and a seat back attaching member. Within the internal disc is a set of slots that may be actuated by a center shaft that is driven by a motor. When the internal disc is rotated, the desired seat back position is the end result as the motion is discontinued.

10 Claims, 2 Drawing Sheets

POWER DISC STYLE SEAT RECLINER

BACKGROUND OF THE INVENTION

The present invention relates to a seat reclining mechanism and, more particularly, to a seat reclining mechanism that positions the seat back to a desired angle in a motor vehicle.

Current designs for seating mechanisms in motor vehicles are large, complicated, costly to manufacture and cannot be operated with power. These conventional seating mechanisms often use gear teeth and are noisy and weak relative to current design requirements.

As can be seen, there is a need for a small, simple, lightweight and quietly operated seat reclining mechanism that may be used with both power and manually adjusted seat backs.

SUMMARY OF THE INVENTION

In one aspect of the present invention, a seat reclining mechanism comprises a seat base mounted disc adapted to be attached to a seat base; a seat back mounted disc adapted to be attached to a seat back; at least two base mounted disc slots in the seat base mounted disc; at least two back mounted disc slots in the seat back mounted disc; a internal disc sandwiched between the seat back mounted disc and the seat base mounted disc; at least two internal disc slots in the internal disc; and a pin extending through each of the at least two base mounted disc slots, through each of the at least two internal disc slots and through each of the at least two back mounted disc slots.

In another aspect of the present invention, a seat reclining mechanism comprises a seat base mounted disc adapted to be attached to a seat base; a seat back mounted disc adapted to be attached to a seat back; two base mounted disc slots in the seat base mounted disc; two back mounted disc slots in the seat back mounted disc; a internal disc sandwiched between the seat back mounted disc and the seat base mounted disc; two internal disc slots in the internal disc; a pin extending through each of the at least two base mounted disc slots, through each of the at least two internal disc slots and through each of the at least two back mounted disc slots; and a central shaft attached to the internal disc, the central shaft passing through the seat base mounted disc and the seat back mounted disc, wherein the base mounted disc slots, the internal disc slots and the back mounted disc slots align over movement of the seat back from an upright to a reclining position.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, an embodiment of the present invention provides a power disc style seat reclining mechanism for a vehicle seat. The seat reclining mechanism includes a seat base fixed mounted guide disc pivotally connected to a set of pivotal discs. The pivotal discs include an internal disc segment and a seat back attaching member. Within the internal disc is a set of slots that may be actuated by a center shaft that is driven by a motor. When the internal disc is rotated, the desired seat back position is the end result as the motion is discontinued.

Figure 1:
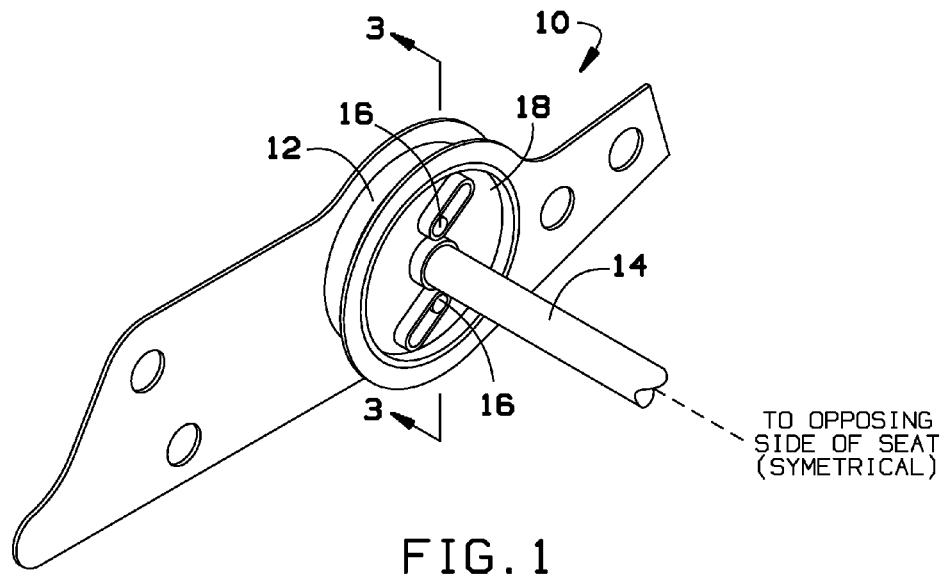
FIG. 1 is a perspective view of a power disc style seat reclining mechanism according to an exemplary embodiment of the present invention.
Figure 2:
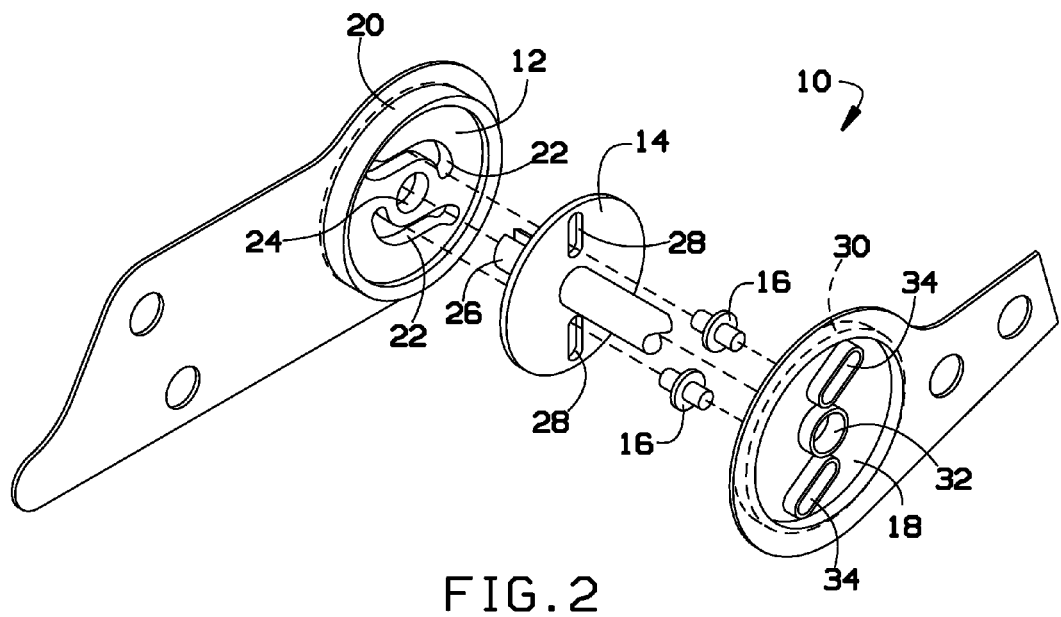
FIG. 2 is an exploded view of the seat reclining mechanism of FIG. 1.
Figure 3:
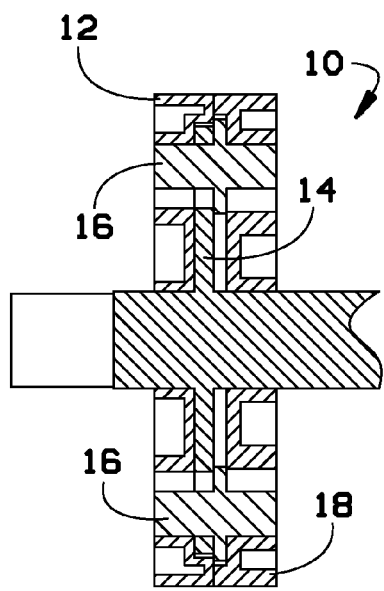
FIG. 3 is a cross-sectional view taken along line 3-3 of FIG. 1.
Figure 4:
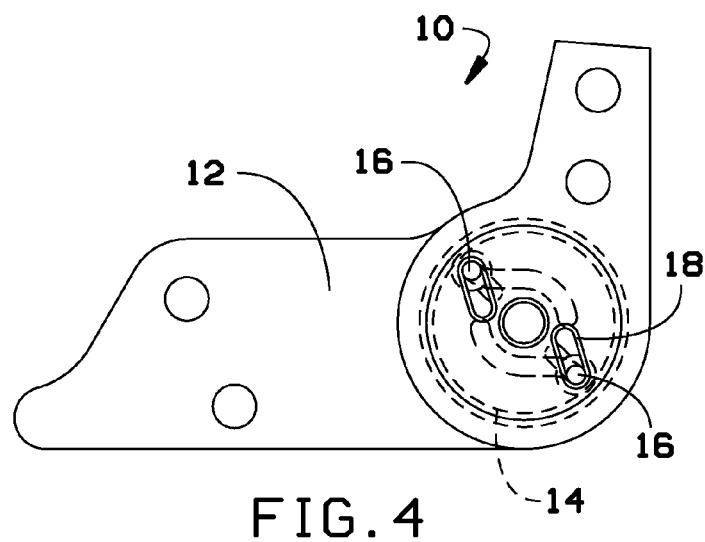
FIG. 4 is a side view of the seat reclining mechanism of FIG. 1 in sitting position.
Figure 5:
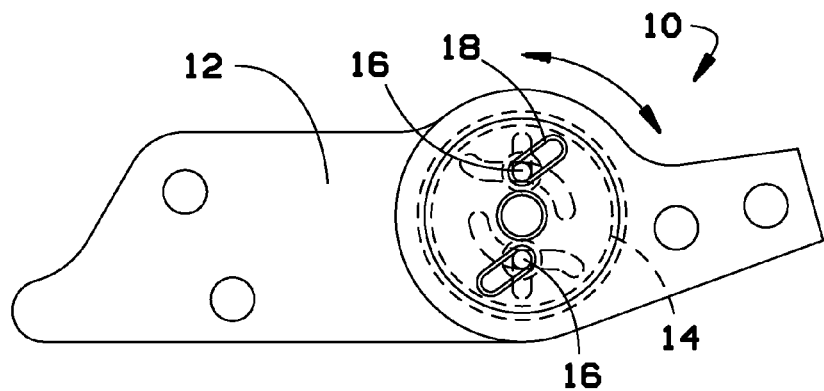
FIG. 5 is a side view of the seat reclining mechanism of FIG. 1 in a reclining position.

Referring to FIGS. 1 through 5, a power disc style seat reclining mechanism 10 (also referred to seat reclining mechanism 10) may include a seat base mounted guide disc 12. The seat base mounted guide disc 12 may be fixed to a seat base (not shown), such as a seat base of an automotive seat. A circular ridge 20 may be formed in one end of the seat base mounted guide disc 12. A hole 24 may be formed in a central area of the circular ridge 20. Two slots 22 may be formed on each side of the hole 24. The slots 22 may be arcuate shaped in an elongated S-shape, as shown in FIGS. 2, 4 and 5.

The circular ridge 20 may be adapted to receive an internal disc 14. The internal disc 14 may include a center shaft 26. One end of the center shaft 26 may fit into the hole 24 in the seat base mounted guide disc 12. The other end of the center shaft 26 may pass through a seat back mounted disc 18 and continue to the other side of the seat (not shown), where a similar mechanism 10 may be disposed. Slots 28 may be cut in the internal disc 14. The slots 28 may align with the slots 22 in the mounted guide disc.

The seat back mounted disc 18 may include a circular ridge 30 adapted to mate with the circular ridge 20 of the seat base mounted guide disc 12. The seat back mounted disc 18 may include a hole 32 adapted to receive the center shaft 26 of the internal disc 14. The seat back mounted disc 18 may include slots 34. The slots 34 may align with the slots 28 in the internal disc 14 and the slots 22 in the seat base mounted guide disc 12. Load bearing pins 16 may extend through the slots 22, 28, 34.

The internal disc 14 may slide the load bearing pins 16 into a desired seat back position that is selected. A shoulder feature on the pins 16 and a washer/bushing may support the pin traveling in the slots 22, 28, 34. When the pins 16 are driven, the mechanism may stop at the desired seat back position and the shared opposing slots act as a locking mechanism. The load bearing pins 16 that are engaged into the slot 34 of the seat back mounted disc 18 may be where the focus of the load is guided, which is dispersed to the seat base mounted disc 12. The geometric travel of the motor driven internal disc 14 may have no transferred load due to the locking effect of the opposing slots 22, 34 of the seat base mounted disc 12 and the seat back mounted disc 18. Pull test loads are not aligned to the rotational pivoting required to change the seat back positioning. Springs (not shown) may be added to keep the assembly counterbalanced under tension between the seat base mounted disc 12 and the seat back mounted disc 18.

While the above description and drawings describe two slots in each of the seat base mounted disc 12, the internal disc 14 and the seat back mounted disc 18, other configurations may be within the scope of the present invention. For example, three slots and pins may be used to provide additional load bearing capabilities.

While the above description describes a seat reclining mechanism for automotive seats, other adjustable seats may use the design of the present invention. For example, medical chairs, beds or stretchers; aerospace seats; residential seating; and commercial seating may be examples of fields where the mechanism of the present invention may be beneficial.

It should be understood, of course, that the foregoing relates to exemplary embodiments of the invention and that modifications may be made without departing from the spirit and scope of the invention as set forth in the following claims.

What is claimed is:

1. A seat reclining mechanism comprising:
   a seat base mounted disc adapted to be attached to a seat base;
   a seat back mounted disc adapted to be attached to a seat back;
   at least two elongated base mounted disc slots in the seat base mounted disc;
   at least two elongated back mounted disc slots in the seat back mounted disc;
   an internal disc sandwiched between the seat back mounted disc and the seat base mounted disc;
   at least two elongated internal disc slots in the internal disc; and
   a pin extending through each of the at least two base mounted disc slots, through each of the at least two internal disc slots and through each of the at least two back mounted disc slots, whereby rotation of the internal disc causes the back mounted disc to rotate relative to the base mounted disc by sliding the pin along the slots.

2. The seat reclining mechanism of claim 1, further comprising a central shaft attached to the internal disc, the central shaft passing through the seat base mounted disc and the seat back mounted disc.

3. The seat reclining mechanism of claim 1, wherein each of the pins has a shoulder adapted to retain the pin in position.

4. The seat reclining mechanism of claim 2, wherein the central shaft is adapted to be driven by a motor to adjust the position of the seat back.

5. The seat reclining mechanism of claim 2, wherein the at least two base mounted disc slots are arcuate slots on opposite sides of a central opening.

6. The seat reclining mechanism of claim 5, wherein the at least two internal disc slots are in line with each other and perpendicular to the central shaft.

7. The seat reclining mechanism of claim 6, wherein the at least two back mounted disc slots run parallel to each other.

8. The seat reclining mechanism of claim 1, further comprising a circular ridge on the seat base mounting disc, the circular ridge adapted to house the internal disc therewithin.

9. A seat reclining mechanism comprising:
   a seat base mounted disc adapted to be attached to a seat base;
   a seat back mounted disc adapted to be attached to a seat back;
   at least two elongated base mounted disc slots in the seat base mounted disc;
   at least two elongated back mounted disc slots in the seat back mounted disc;
   an internal disc sandwiched between the seat back mounted disc and the seat base mounted disc;
   at least two elongated internal disc slots in the internal disc;
   a pin extending through each of the at least two base mounted disc slots, through each of the at least two internal disc slots and through each of the at least two back mounted disc slots; and
   a central shaft attached to the internal disc, the central shaft passing through the seat base mounted disc and the seat back mounted disc, wherein
   the base mounted disc slots, the internal disc slots and the back mounted disc slots align over movement of the seat back from an upright to a reclining position, whereby rotation of the internal disc causes the back mounted disc to rotate relative to the base mounted disc by sliding the pin along the slots.

10. The seat reclining mechanism of claim 9, wherein:
    each of the pins has a shoulder adapted to retain the pin in position; and
    the central shaft is adapted to be driven by a motor to adjust the position of the seat back.

* * * * *